(12) United States Patent
Andessner et al.

(10) Patent No.: US 12,395,051 B2
(45) Date of Patent: Aug. 19, 2025

(54) METHOD FOR INSTALLING AN AXIAL FLUX MACHINE

(71) Applicant: Miba eMobility GmbH, Laakirchen (AT)

(72) Inventors: Dietmar Andessner, Offenhausen (AT); Christian Dorfbauer, Linz (AT); Philipp Lucas Fruehwirth, Kirchham (AT); Thomas Riedl, St. Pantaleon-Erla (AT); Christian Sandner, Gmunden (AT); Gerold Stetina, Voecklabruck (AT)

(73) Assignee: Miba eMobility GmbH, Laakirchen (AT)

( * ) Notice: Subject to any disclaimer, the term of this patent is extended or adjusted under 35 U.S.C. 154(b) by 255 days.

(21) Appl. No.: 18/035,983

(22) PCT Filed: Nov. 12, 2021

(86) PCT No.: PCT/AT2021/060431
§ 371 (c)(1),
(2) Date: May 9, 2023

(87) PCT Pub. No.: WO2022/099344
PCT Pub. Date: May 19, 2022

(65) Prior Publication Data
US 2024/0022148 A1 Jan. 18, 2024

(30) Foreign Application Priority Data
Nov. 13, 2020 (AT) .............................. A 50991/2020

(51) Int. Cl.
*H02K 15/06* (2025.01)
*H02K 15/061* (2025.01)
*H02K 21/24* (2006.01)

(52) U.S. Cl.
CPC ........... *H02K 15/061* (2013.01); *H02K 21/24* (2013.01)

(58) Field of Classification Search
CPC ...... H02K 21/24; H02K 15/061; H02K 15/00; H02K 15/02; H02K 1/30; H02K 1/182; H02K 11/33; H02P 6/182
See application file for complete search history.

(56) References Cited

U.S. PATENT DOCUMENTS

| 7,394,177 B2 | 7/2008 | Vogt et al. |
| 10,985,639 B2 * | 4/2021 | McElhose .............. H02K 15/02 |

(Continued)

FOREIGN PATENT DOCUMENTS

| DE | 102 07 310 A1 | 9/2003 |
| EP | 1 672 770 B1 | 6/2008 |

OTHER PUBLICATIONS

International Search Report in PCT/AT2021/060431, mailed Feb. 24, 2022.

*Primary Examiner* — Leda T Pham
(74) *Attorney, Agent, or Firm* — Collard & Roe, P.C.

(57) ABSTRACT

An axial flux machine and a method for installing an axial flux machine has at least two active parts in a motor housing, of which active parts a first active part is configured as a rotor having a number of permanent magnets and a second active part is configured as a stator having a number of electrical windings, wherein the rotor and the stator are arranged adjacent to each other and in a rotation-proof manner, in a transport configuration in a space-saving package, in particular a stack, formed by the magnetic attractive forces of the permanent magnets.

8 Claims, 8 Drawing Sheets

(56) References Cited

U.S. PATENT DOCUMENTS

Figure 1:
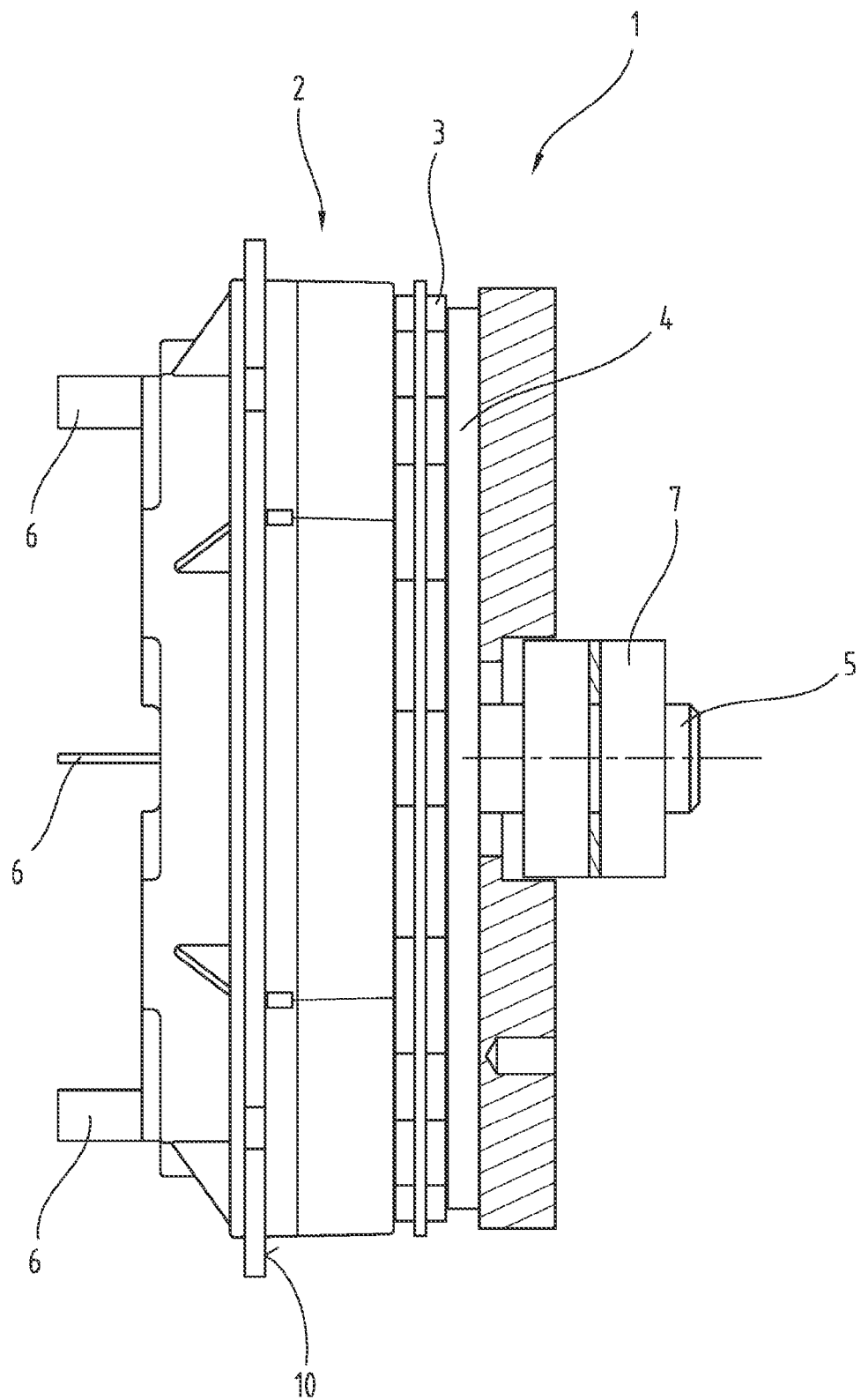

2017/0117763 A1    4/2017  Woolmer et al.
2023/0032576 A1*   2/2023  Lampérth ................ H02K 1/27

* cited by examiner

METHOD FOR INSTALLING AN AXIAL FLUX MACHINE

CROSS REFERENCE TO RELATED APPLICATIONS

This application is the National Stage of PCT/AT2021/060431 filed on Nov. 12, 2021, which claims priority under 35 U.S.C. § 119 of Austrian Application No. A50991/2020 filed on Nov. 13, 2020, the disclosure of which is incorporated by reference. The international application under PCT article 21(2) was not published in English.

The invention relates to a method for installing an axial flux machine having at least two active parts in a motor housing, of which active parts a first active part is configured as a rotor having a number of permanent magnets and a second active part is configured as a stator having a number of electrical windings, wherein the rotor and the stator are arranged adjacent to each other and in a rotation-proof manner, in a transport configuration in a space-saving package, in particular a stack, formed by means of the magnetic attractive forces of the permanent magnets.

Different axial flux machines are known from the prior art. These electrical machines are characterized by a simple structure, a low weight and a high torque density. Electrical machines entail high requirements regarding their assembly and installation. Low tolerances are provided and thus, high precision is required during the installation of such machines. Furthermore, machines of this type are sensitive to contaminations Minimum distances between rotor and stator and/or other active parts also result in high requirements to the transport of the machines and/or their parts.

Usually, axial flux machine have at least two active parts. For example, for a disc-shaped rotor, one or multiple stators may be provided. In this regard, the rotor is usually equipped with one or multiple permanent magnets. The permanent magnet may also be formed as a single piece, wherein, for example, multiple poles may be formed by magnetization. An air gap is provided between the rotor and the stator. Corresponding poles with coil windings, by the energization of which a suitable magnetic field is established, are formed on the stator. By the interaction between the magnetic field of the stator and the magnetic field of the rotor, the rotor is moved and a torque is transmitted to a rotor shaft.

Different concepts for securing electrical machines or their parts during transport are known from the prior art. For example, it is known from publication DE10207310A1 to fix the stator by means of a recess on the outside of the stator via a positive connection and thus the relative position of stator to rotor.

A frameless torque motor with a transport lock is known from publication EP1672770B1. Here, a transport lock is provided between a primary and a secondary part as a spacer.

From publication US2017/0117763A1, a concept of a special axial flux machine with a method for installing the same in a motor housing is known, which, however, turns out to be complex in practice.

The concepts for axial flux machines known from the prior art and in particular the concepts for safe transport and simple installation of the axial flux machine and/or its parts have proven to be inadequate, costly and in need of improvement in practice.

It is one of the objects of the present invention to improve the prior art. It is a further object of the present invention to advance the design of an axial flux machine known from the prior art such that the axial flux machine and/or its active parts may be easily transported and easily and efficiently be installed in a suitable motor housing. It is one of the objects of the invention to improve an axial flux machine according to the preamble of claim 1.

The inventive object is achieved according to the characterizing part of claim 1.

According to a particular embodiment of the invention, a method for installing an axial flux machine with at least two active parts in a motor housing is provided, of which active parts a first active part is configured as a rotor with a number of permanent magnets and a second active part is configured as a stator with a number of electrical windings, wherein the rotor and the stator are arranged adjacent to each other and in a rotation-proof manner, in a transport configuration in a space-saving package, in particular a stack, formed by means of the magnetic attractive forces of the permanent magnets, wherein the rotor and the stator are arranged immediately adjacent to one another in the transport configuration such that at least in partial regions of the rotor, the rotor contacts the adjacent stator without play and without an air gap, and subsequently the package is introduced into the motor housing and positioned in the motor housing such that subsequently, by means of, on the one hand, a first mechanical, in particular in the direction of the rotor shaft, axial stop arranged on the motor housing for at least one of the at least two active parts, and, on the other hand, a first tension and/or compression element cooperating therewith and being arranged on the motor housing, which—acting against the magnetic attractive forces of the permanent magnets of the rotor to the stator—increases the distance between the rotor and the stator, at least one air gap required for the operation of the axial flux machine is set between the rotor and the stator.

By definition, active parts are all those parts of the axial flux machine which are active in the sense of generating and guiding a magnetic field. On the one hand, these are rotors, stators and other electrically/magnetically active parts, for example components for the magnetic return.

Special precautions must be taken when handling and assembling rotors, since on the one hand strong attractive forces act between the rotor, the iron components and other magnets positioned in the environment, and on the other hand the permanent magnets of the rotor attract magnetic dirt and dust.

In particular, when active parts, for example rotors and/or stators, of an axial flux machine are supplied without a housing, easy and efficient handling of the components during assembly of the axial flux machine is of great importance to the customer who assembles the axial flux machine and/or installs it in a motor housing.

According to a particular embodiment of the inventive solution, a pre-assembly of the active parts is performed in such a way that the components are stacked without an air gap. As a result, the magnetic field of the magnets is largely shielded and there is no longer any remote effect of the magnetic field. Thus, handling during transport and the assembly process may be significantly simplified. By placing the bearing in a housing and tightening the axial fastening, the air gaps are subsequently adjusted automatically according to one embodiment of the invention. Separate handling of the components is not necessary. According to one embodiment of the invention, a further advantage is that such a pre-assembly can be subjected to a so-called End-Of-Line (EOL) test and, in addition to functional tests, the installation process itself can be simulated at the customer's premises.

According to a particular embodiment of the invention, the rotor is arranged in the package in a position-safe manner, in particular in a rotation-proof and/or displacement-proof manner, due to the magnetic attractive forces between the permanent magnets of the rotor and the magnetic material in the other active parts. Rotation-proof, in this context, is defined as an arrangement in which the rotor is hindered from relative rotation, relative to the other active parts, by the other components. In this sense, due to the magnetic attraction, there is an, at least partial, force-fit, in particular by the effect of friction, between the active parts.

According to a particular embodiment of the invention, the method according to the invention makes it possible to reduce the occurrence of stray fields at the rotor and, due to the direct contact of the active parts, contamination of the rotor at the contact surfaces can be substantially reduced or prevented.

According to the invention, the stator and/or the rotor may have an at least partial overmold with a plastic and/or a thermoplastic material. Such an overmold is integrally bonded and remains adhered to the active part also during operation.

According to the invention, the surface of the contacting active parts has a certain unevenness and/or roughness. For this reason, such a contact between the active parts will never be completely planar. Furthermore, it may be provided that the surface of the active parts has a predetermined geometric shape, for example conically shaped surface portions, and/or structure, for example with protruding ribs. In such a case, the contacting is established via this structure or its elements, in particular the ribs.

According to a particular embodiment of the invention, the rotor and the stator in the transport configuration contact each other over a proportion of at least 20%, at least 50% or at least 80% of the surface portions opposite each other in the package in a planar manner without an air gap.

According to a particular embodiment, no spacers are arranged between the active parts contacting each other without play.

According to a particular embodiment of the invention, the at least two active parts of the axial flux machine are telescopically spaced apart from each other starting from the package-like transport configuration during installation and/or assembly in the motor housing. In this regard, the air gaps between the rotor(s) and the further active parts, which are essential for the operation of the axial flux machine, are adjusted.

According to a particular embodiment of the invention, the installation space of the motor housing for positioning the axial flux machine is pot-shaped and the package of the at least two active parts in the transport configuration is inserted from a first side into the thus formed at least partially hollow installation space of the motor such that at least the region of contact between the stator and the rotor is covered laterally by the motor housing. Thereby, the active parts are protected from dust and/or other impurities and/or damage. According to a further embodiment, magnetic stray fields of the magnetically active parts are thereby also minimized.

According to a particular embodiment of the invention, at least one of the at least two active parts of the axial flux machine is fixed in the motor housing via the first tension and/or compression element. According to a particular embodiment, the invention thus enables the fastening and/or positioning of all active parts in a single operation.

According to a particular embodiment of the invention, the first tension and/or compression element is configured as a part of a screw connection.

According to a particular embodiment of the invention, the stator is positioned in the installation space of the motor housing via the first stop. In this regard, the first tension and/or compression element enlarges the distance between the rotor and the stator by exerting a tension and/or compression force from the side of the motor housing opposite to the side of the insertion of the package into the motor housing onto the rotor, thereby adjusting the at least one air gap between the stator and the rotor required for the operation of the axial flux machine.

According to a particular embodiment of the invention, the at least two active parts, as a further active element, comprise a return element arranged in the package of the transport configuration on the side of the rotor opposite to the stator. After positioning of the package in the motor housing, the return element is removed from the rotor by the first tension and/or compression element and/or a further tension and/or compression element, whereby a further air gap of the at least one air gap required for operation of the axial flux machine is set in this case between the rotor and the return element.

According to a further embodiment, the invention is further characterized by a transport configuration of the active parts of an axial flux machine for use in a method according to one of the preceding claims 1 to 6.

According to a further embodiment, the invention is further characterized by an axial flux machine in a motor housing installed in the motor housing using a method according to one of claims 1 to 6.

According to a particular embodiment of the axial flow machine, the active parts are arranged in the transport configuration in the order of installation and/or assembly handling accordingly.

This measure makes it possible to install the active parts in a particularly efficient and time-saving manner.

According to a further particular embodiment of the axial flux machine, a rotor shaft is provided. The package of the active parts is already arranged on the rotor shaft in the transport configuration.

This measure essentially simplifies the installation of the active parts and/or the axial flux machine.

According to a further possible embodiment of the invention, a mechanical stop is provided on a first one of the at least two active parts, which stop may cooperate with a mechanical stop in the motor housing to thus define the installation position of the first active part in the motor housing.

According to a further possible embodiment of the invention, a rotor shaft is provided and is exerted via the tension/compression element in interaction with the mechanical stop in the motor housing when the package is installed in the motor housing via a tension or compression force acting against the magnetic attractive forces of the permanent magnets in the direction of the axis of the rotor shaft such that one or more air gaps are formed, in particular on the rotor.

According to a further possible embodiment of the invention, the tension/compression element comprises an adjusting mechanism, preferably a thread.

According to a further embodiment, the air gap(s) may be adjusted by the adjusting mechanism.

According to a further possible embodiment of the invention, the first active part is configured as a stator, the second active part is configured as a rotor and a third active part is provided as a return element to realize the magnetic return.

According to a further possible embodiment, the invention is characterized by an axial flux machine with a first active part configured as a stator and a second active part configured as a rotor with a plurality of permanent magnets and a third active part configured as a return element. In this regard, the active parts are arranged adjacent to one another, in particular adjoining one another, in a transport configuration in a space-saving package, in particular in a stack, formed by the magnetic attractive forces of the permanent magnets, such that the rotor is arranged between the stator and the return element in a preferably rotation-proof manner by the magnetic attractive forces of the permanent magnets of the rotor. According to a particular embodiment, the invention is characterized in that a mechanical stop is provided on the stator which cooperates with an axial stop surface in the motor housing and the return element also has an axial stop surface which cooperates with a further axial stop surface in the motor housing. By a tension/compression element, for example a screw connection, an adjusting mechanism is thus realized, by means of which, for example with a thread, the return element, when it is mounted in the motor housing, can be removed from the rotor in the axial direction with the tension and/or compression force exerted by the tension/compression element, such that an air gap may be adjusted between the rotor and the return element. Furthermore, by displacing the shaft and the rotor attached thereto, this displacement of the shaft being effected in particular by the return element, a further air gap is created between the stator and the rotor, such that the rotor can be rotated in the motor housing in the assembled state.

According to a particular embodiment of the axial flux machine, a rotor shaft is provided and the package of active parts is already arranged on the rotor shaft in the transport configuration.

According to a particular embodiment of the invention, an axial flux machine is provided with a first active part configured as a first stator and a second active part configured as a rotor with a number of permanent magnets and with a third active part configured as a second stator. In this regard, the active parts are arranged adjacent to one another, in particular adjoining one another, in a transport configuration in a space-saving package, in particular in a stack, formed by the magnetic attractive forces of the permanent magnets, such that the rotor is arranged between the first and the second stator in a preferably rotation-proof manner by the magnetic attractive forces of the permanent magnets. According to a particular embodiment of the invention, a mechanical stop is provided in the motor housing for both the first and the second stator. According to a further embodiment, a tension and/or compression element, for example a screw connection, is provided, whereby the second stator, when it is mounted, can be removed from the rotor with the tension and/or compression force exerted by the tension and/or compression element, so that an air gap is set between the first stator and the rotor on the one hand and the rotor and the second stator on the other hand, and the rotor becomes rotatable in the motor housing in the assembled state.

According to a further possible embodiment of the invention, an axial flux machine is provided with a first active part, which is configured as a stator, and a second active part, which is configured as a rotor with a number of permanent magnets, wherein the two active parts are adjacent to one another, in particular adjacent to one another in a transport configuration in a space-saving package, in particular in a stack, formed by the magnetic attractive forces of the permanent magnets, such that the rotor is connected to the stator by the magnetic attractive forces, in a preferably rotation-proof manner, and a rotor shaft is provided on which the rotor is arranged. According to a particular embodiment, the invention is characterized in that a mechanical, in particular axial, stop is provided in the motor housing, which interacts with the rotor shaft, so that, for example, in particular a bearing of the rotor shaft is positioned via the stop. According to a further embodiment, a tension and/or compression element, in particular with an adjusting mechanism, for example a thread, is provided, whereby the stator, when it is mounted in the motor housing, can be removed from the rotor axially, against the attractive forces of the permanent magnets and against the stop and/or the stops, in particular in the direction of the rotor shaft axis, with a tension force of the tension and/or compression element, such that an air gap is set between the stator and the rotor and the rotor becomes rotatable in the motor housing in the mounted state.

According to a further possible embodiment, the invention is characterized by a method for mounting an axial flux machine, wherein the active parts of the axial flux machine are transported adjacent to one another, in particular adjoining one another, in a transport configuration in a space-saving package, in particular in a stack, formed by the magnetic attractive forces of the permanent magnets, wherein the rotor is arranged in the package of active parts in a preferably rotation-proof manner due to the magnetic attractive forces of the permanent magnets, and subsequently the package is inserted into the motor housing, wherein at least one of the active parts has a mechanical stop for a corresponding stop in the motor housing and a tension and/or compression element, for example a screw connection, is provided in the motor housing, which is configured such that, when the package of active parts is mounted in the motor housing, the active parts are separated from one another by exertion of a tension and/or compression force which acts against the magnetic attractive forces of the permanent magnets and interacts with the stop, and an air gap is thereby set between the rotor and the other active parts by the assembly and the rotor becomes rotatable in the motor housing in the assembled state.

Figure 2:
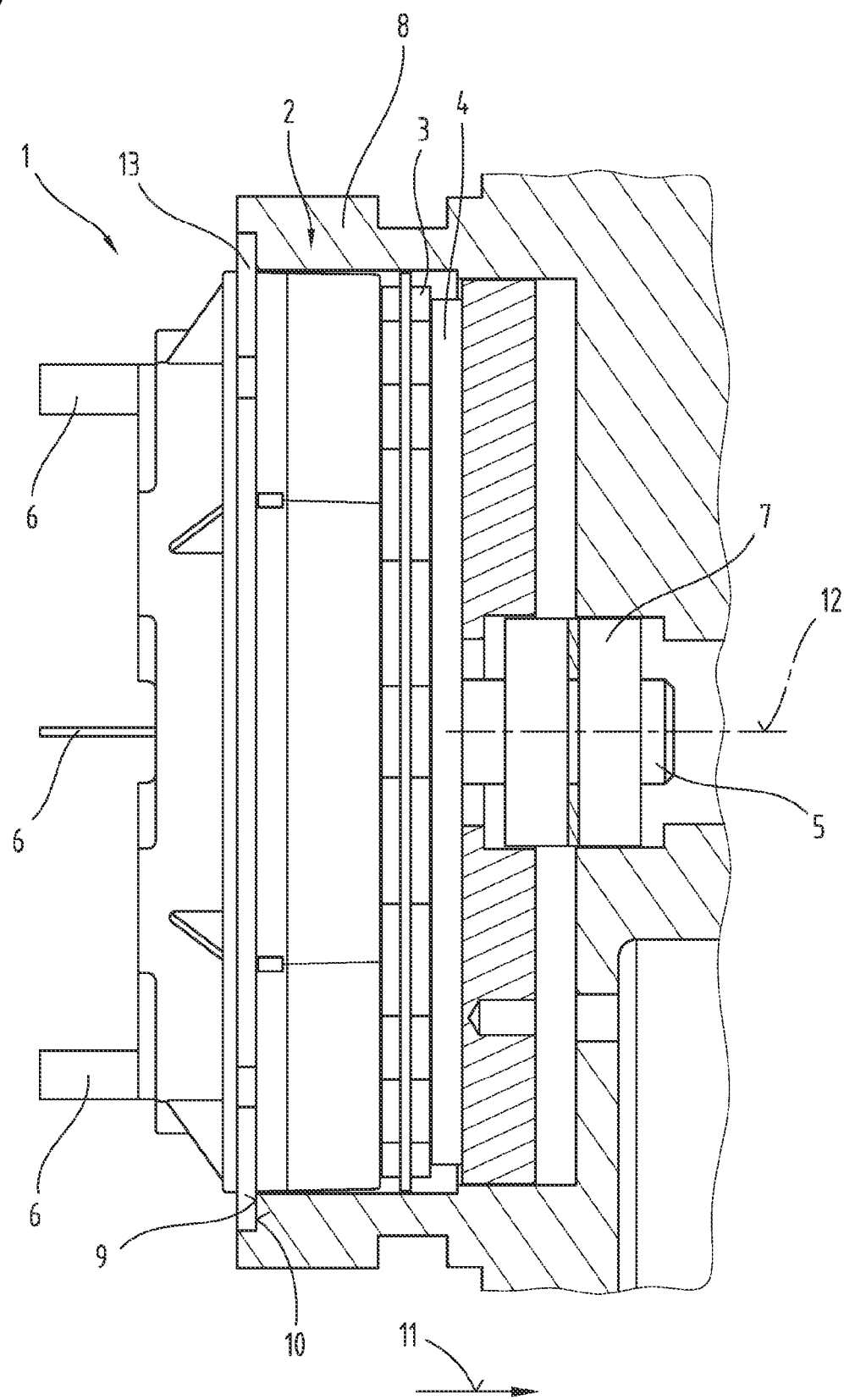
Figure 3:
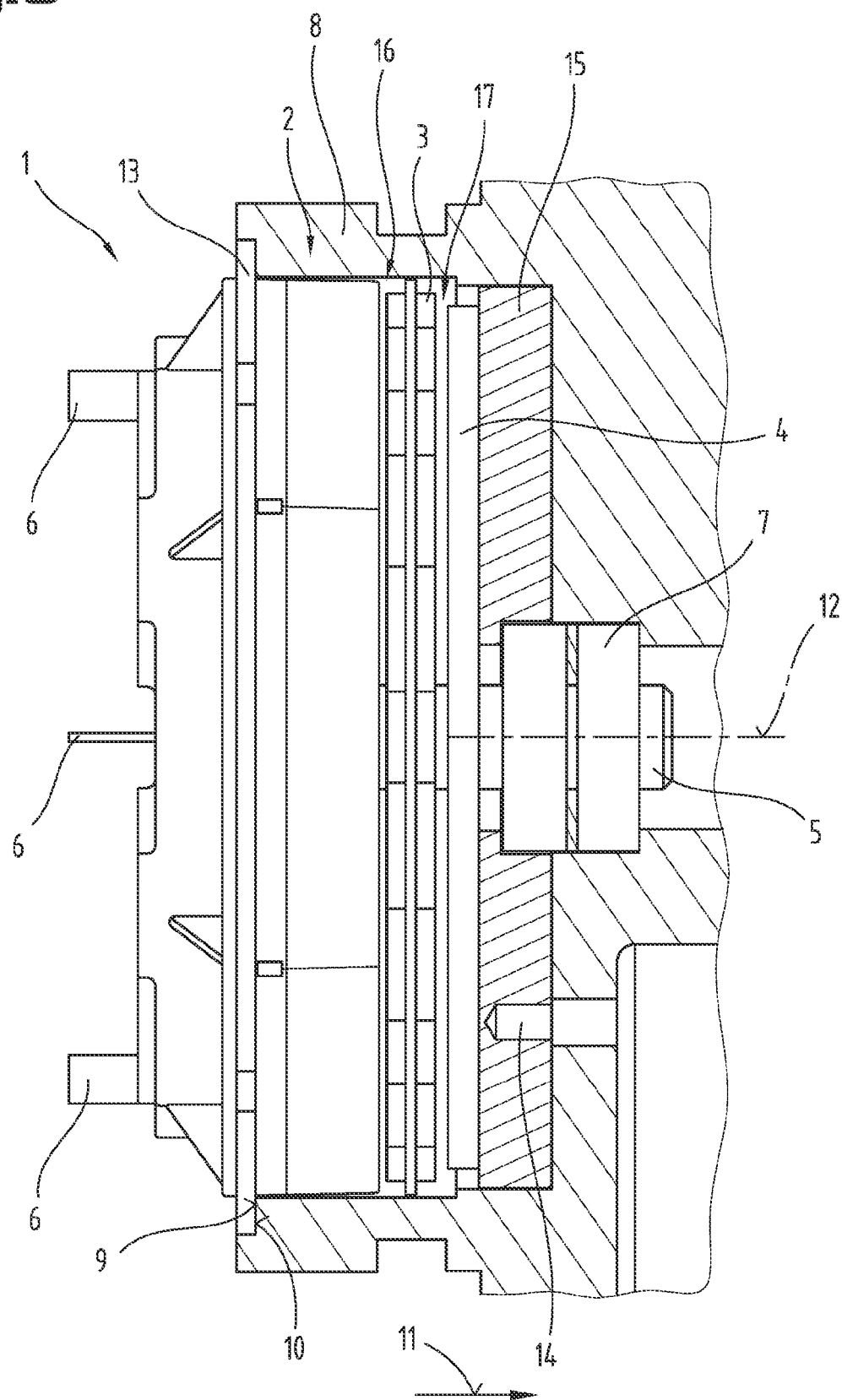
Figure 4A:
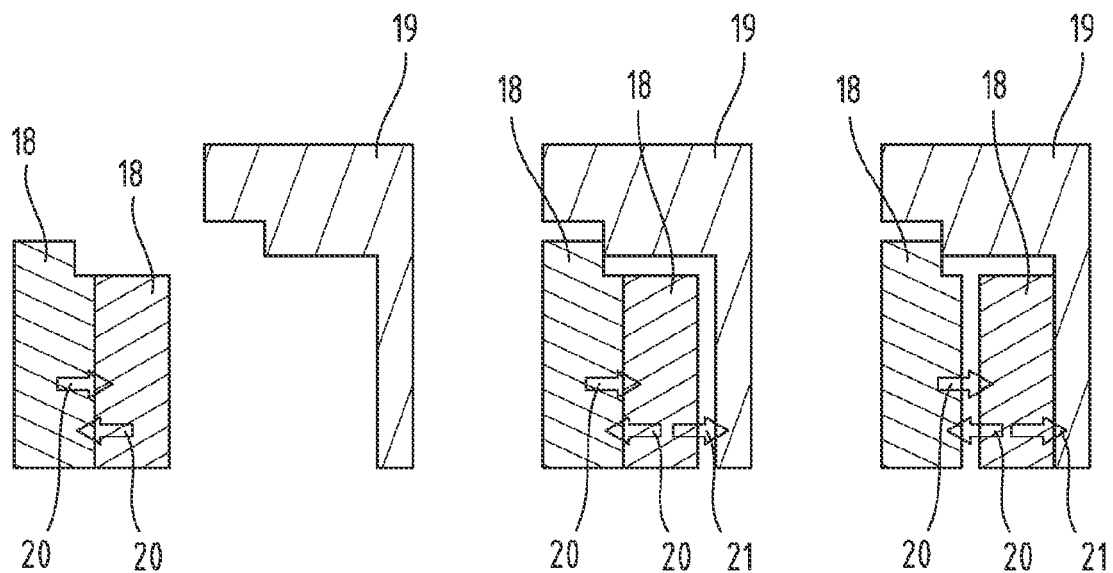
Figure 4B:
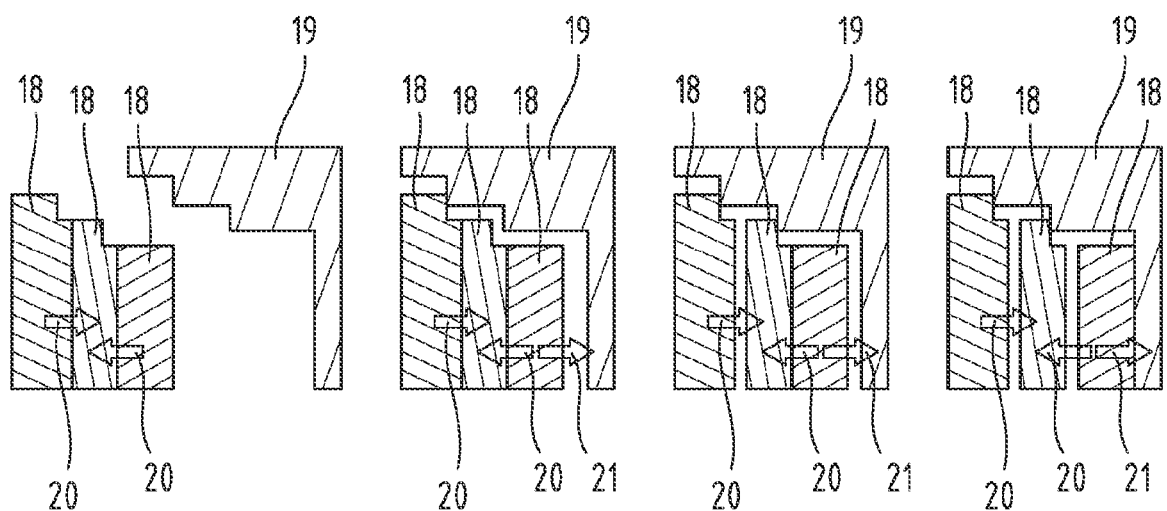
Figure 5A:
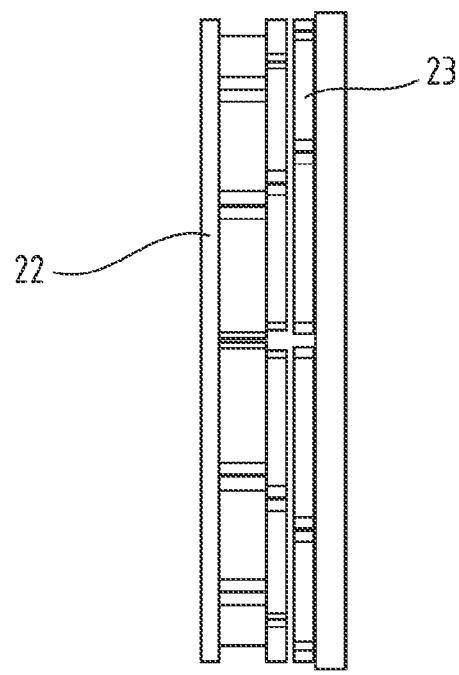
Figure 5B:
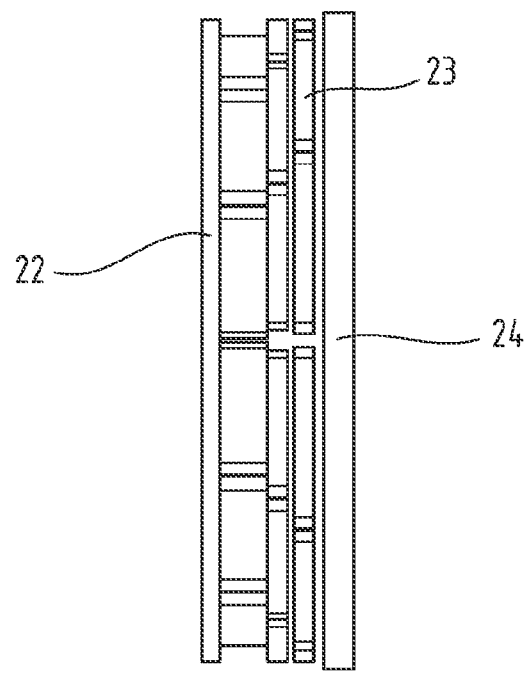
Figure 5C:
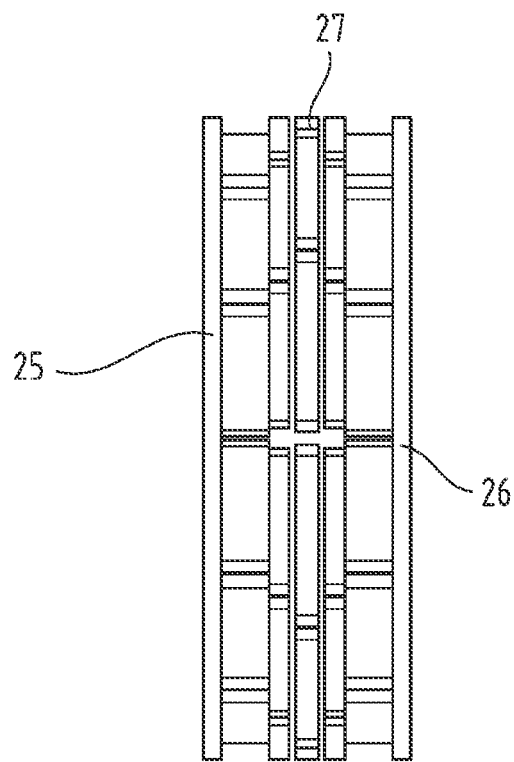
Figure 5D:
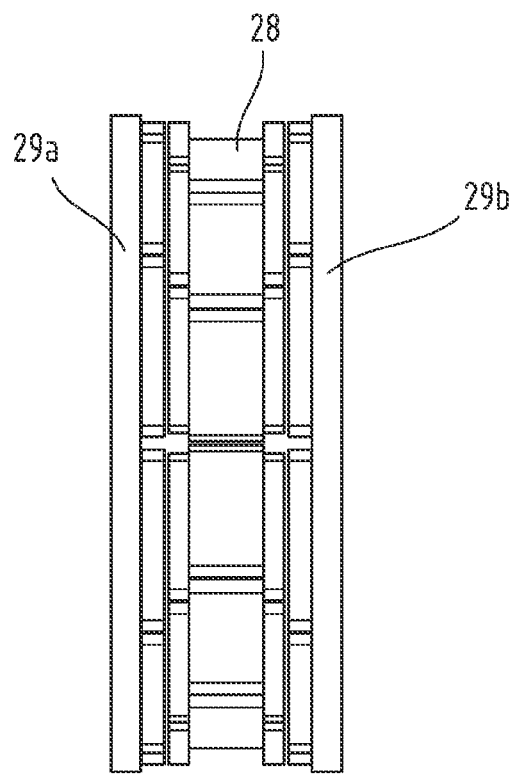
Figure 6:
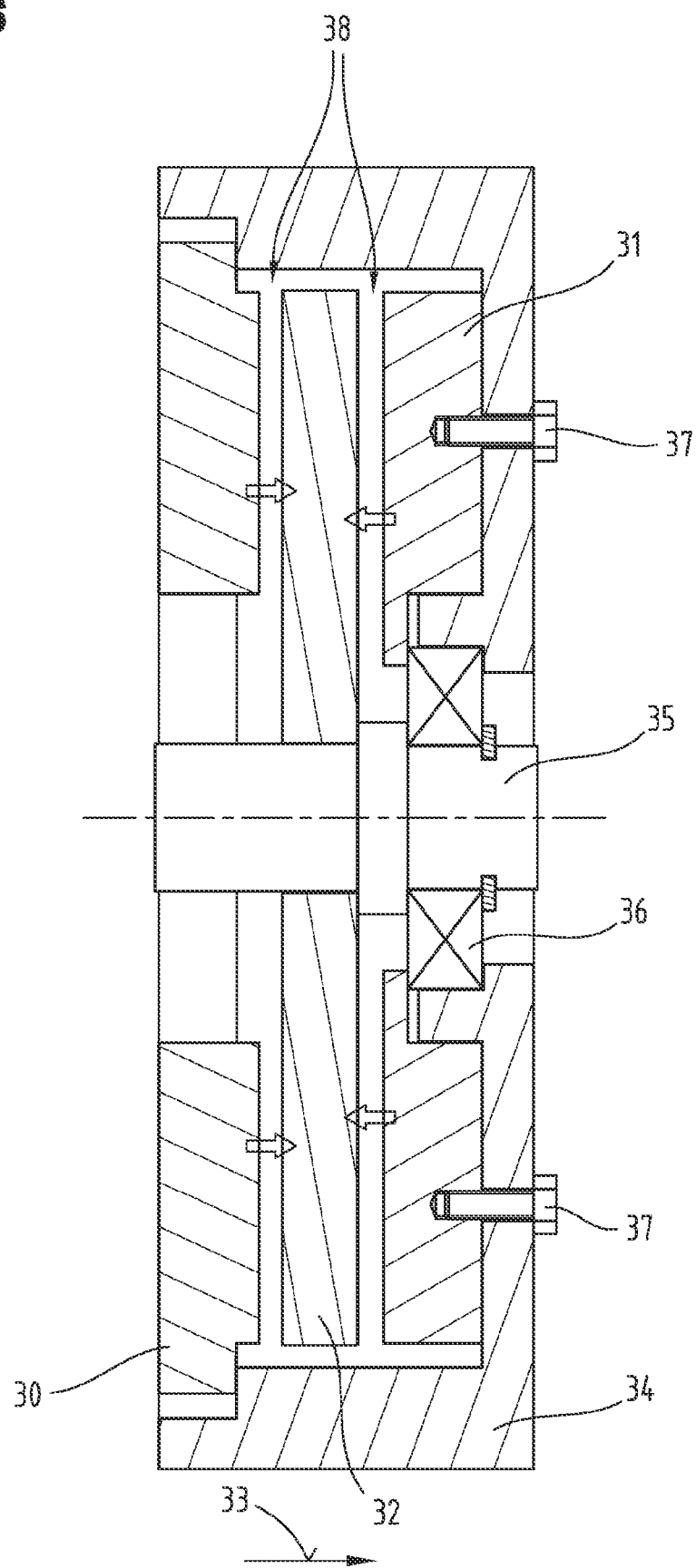
Figure 7:
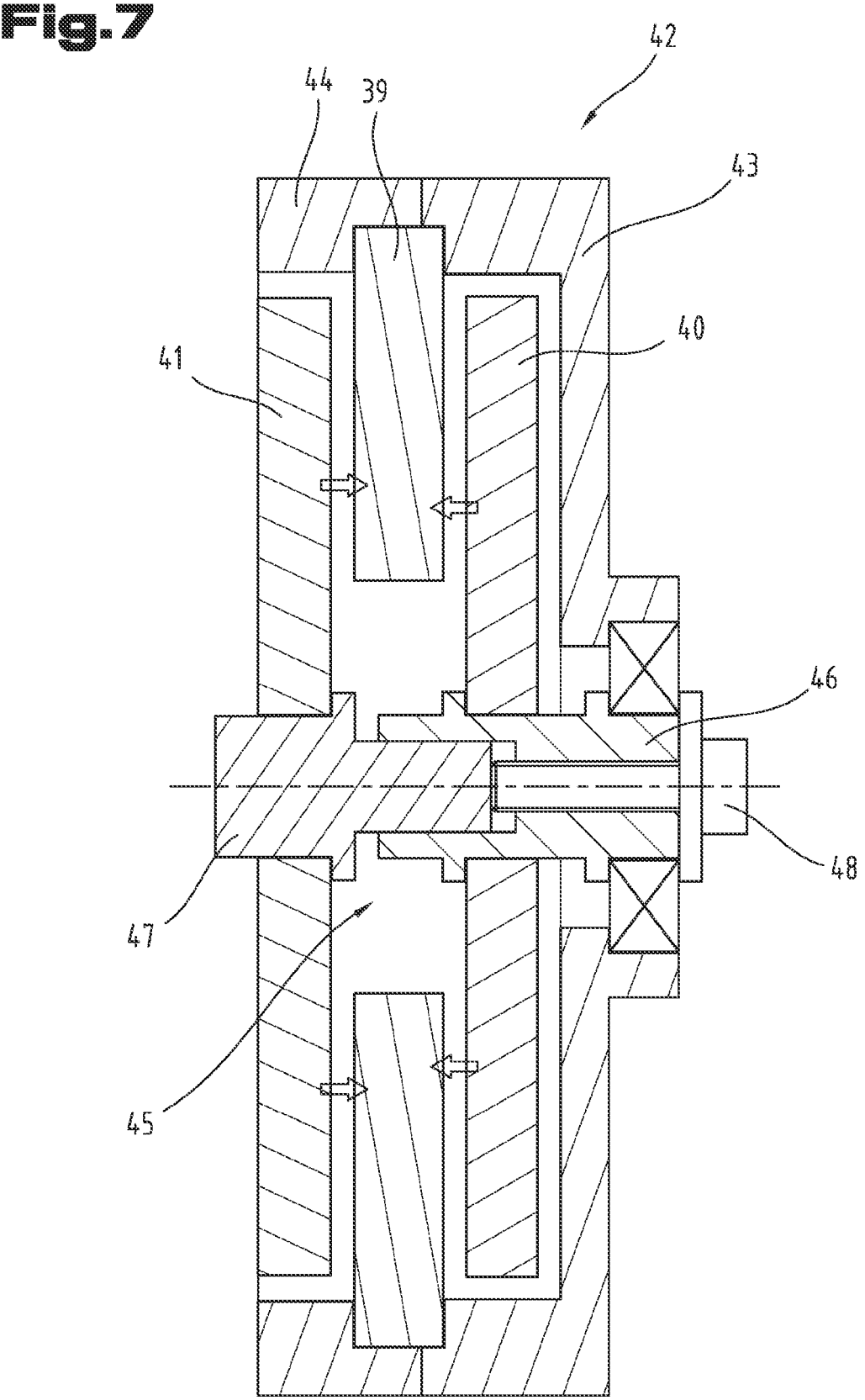
Figure 8:
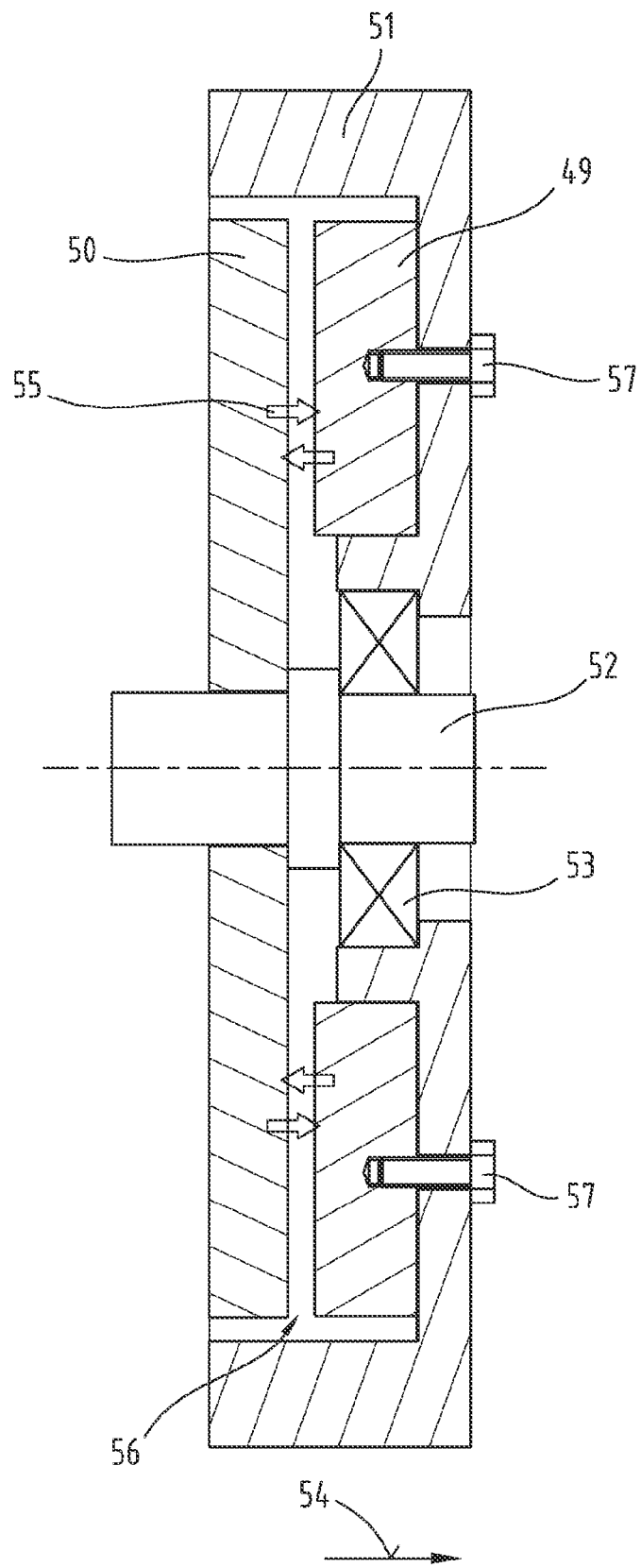

Possible embodiments of the invention are explained in more detail with reference to several schematic drawings, as follows. These show:

FIG. 1 shows a first possible embodiment of the device according to the invention in a transport state FIG. 2 shows the first embodiment of the device according to the invention in a first state during assembly and prior to fixing and/or bringing into position the active parts in a motor housing FIG. 3 shows the first embodiment of the device according to the invention in the built-in state with active parts positioned ready for operation in a motor housing FIGS. 4a and 4b show schematic representations of possible basic principles of utilization of the positioning aids in exemplary embodiments of the present invention FIGS. 5a to 5d show various configurations of axial flux machines covered by the scope of the present invention FIG. 6 shows a possible configuration for mounting a variant of an axial flux machine in a motor housing FIG. 7 shows a second possible configuration for mounting a further variant of an axial flux machine in a motor housing FIG. 8 shows a third possible configuration for mounting a further variant of an axial flux machine in a motor housing FIG. 1 shows an axial flux machine 1 partly in a schematic, isometric projection and partly shown as a section. In the schematic representation, a stator 2, a rotor 3 and a rotor return 4 are shown. As can be seen from FIG. 1, the stator 2, the rotor 3 and the rotor return 4 lie on top of each other, i.e. there is no air gap between the rotor 3 and stator 2 on the one hand and the rotor 3 and the rotor return 4 on the other hand, wherein there is planar contact between these active parts of the axial flux machine, as far as this is possible due to surface roughness and a lack of flatness of the surfaces. The active parts of the electrical machine are arranged in a compact package, like a stack. Due to the permanent magnets of the rotor 3 and the magnetic materials on the stator 2 and/or rotor return 4, magnetic attractive forces are active, which lead to the formation of the stack in the transport configuration and in particular, according to a particular embodiment, fix the rotor and/or the other active parts in this stack, also due to friction, in a rotation-proof or rotationally fixed manner, but also against displacement, in particular at least partially free of play. As can be seen from FIG. 1, a rotor shaft 5 is also already provided in this package. According to a possible embodiment, for example, the rotor 3 is pressed onto the shaft or connected to the rotor shaft in another way, while one of the other two active parts or both active parts are, for example, still displaceably arranged on and/or displaceably arranged opposite the shaft. For the sake of completeness, FIG. 1 schematically shows the electrical connections 6 of the stator and the bearings 7 of the rotor shaft. FIG. 2 shows a first state when the axial flux machine 1 is installed in a motor housing 8. As can be seen in FIG. 2, the housing 8 has a mechanical stop 9 which interacts with a mechanical stop of the stator 2 and/or of the housing of the stator. In FIG. 2 the two mechanical stops are in contact and thus already determine the end position of the stator 2 in the installation direction 11, which is oriented parallel to the rotor shaft axis 12. The mechanical stop 10 of the stator 2 is part of a positioning aid of the axial flux machine. This positioning aid may be configured in a variety of ways and is only explained here by way of exemplary embodiments in an exemplary and non-restrictive manner. In the exemplary embodiment presented, the positioning aid has the shown mechanical stop of the stator in the motor housing 8. The mechanical stop 10 of the stator 2 may be configured, for example, as a ring 13 on the housing of the stator 2. The ring then has an axially arranged suitable stop contour and/or stop surface which interacts with a mechanical stop 9 of the motor housing 8 configured as a counter stop. As can be seen from FIG. 2, the active parts of the axial flux machine are still arranged in the stack in this state, i.e. the rotor 3 is still in contact with the stator 2 and the rotor return 4 without an air gap due to the magnetic forces. As shown, the motor housing 8 is provided with a pot-shaped installation space. In this regard, lateral parts of the motor housing at least partially cover active parts and/or air gaps that arise in the installed, positioned state of the axial flux machine in the motor housing. On the one hand, pot-shaped installation spaces optimally protect the installed machine and, on the other hand, simplify the ready-to-operate installation and/or assembly of such an axial flux machine.

In FIG. 3 the axial flux machine 1 is finally installed and/or fully integrated in the motor housing 8. While the stator 2 has already been positioned in a previous assembly step as shown in FIG. 2, in particular via the mechanical stop in the motor housing, in FIG. 3 the rotor 3 as well as the rotor return 4 are brought into a final position by a screw connection 14. While the holding mechanism holds the stator 2 in position, a tension/compression mechanism is realized by the adjusting drive with the thread of the screw connection 14, which tension/compression mechanism in cooperation with the holding mechanism brings the active parts into their end positions. In this regard, the screw connection 14 engages an armature plate 15 arranged on the rotor return 4 and firmly connected to the rotor return 4 and, supported via the stop of the stator on the stop on the motor housing 5, pulls the armature plate together with the rotor return plate as well as the rotor shaft 5 together with the rotor 3 in the installation direction 11. In a first step, the air gap 17 is formed by moving the rotor return and/or the armature plate. In a second step, the bearing 7 is moved by the armature plate into its end position (see FIG. 3), whereby the air gap 16 is formed by moving the rotor shaft 5 and the rotor 3 attached to the rotor shaft 5. In this regard, the magnetic forces between the stator 2 and the rotor 3 as well as the rotor return 4 and the rotor 3 must be overcome by the adjusting mechanism of the tension and/or compression element, in particular the screw connection 14, which in this case exerts a tensile force. In the final installation situation, the air gap 16 between stator 2 and rotor 3 on the one hand and the air gap 17 between rotor 3 and rotor return 4 on the other hand are thus formed. Based on the schematic representation in FIG. 2, the air gaps 16 and 17 between the rotor and the stator as well as the rotor and the rotor return, as shown only schematically in FIG. 3, are thus formed by the distance between the armature plate 15 and the housing (in the direction of the shaft axis towards the bearing 7) due to the displacement of the armature plate 15. The sum of the widths of the air gaps in FIG. 3 therefore results in the bearing-side distance between the housing and the armature plate according to a preferred embodiment.

In FIG. 4a and FIG. 4b, basic principles of possible embodiments of the present invention are shown schematically. In this regard, an axial flux machine with active parts 18 and a housing 19 is shown. While FIG. 4a schematically shows a configuration of an axial flux machine with 2 active parts, FIG. 4b schematically shows a configuration of an axial flux machine with 3 active parts. The active parts 18 are held in a transport configuration by magnetic attractive forces 20 in the transport configuration, in each case in the left part of the figure, in a compact package, in particular a stack. The axial flux machine has various stops for mounting the package of active parts in the motor housing. In addition, there is a tension and/or compression element (not shown) by which the active parts are telescopically pulled apart when they are installed and/or fixed in the motor housing. When the active parts 18 are installed in the housing, the magnetic attractive forces are at least partially overcome by tensile forces 21 of the tension/compression element (not shown), for example by screwing the active part to the motor housing. By the interaction of the tensile forces with the holding mechanism, for example through the stop of an active part on the motor housing in the axial installation direction, the air gaps between the active parts, for example between the rotor and the stator, are set.

FIGS. 5a to 5d show various configurations of axial flux machines covered by the scope of the present invention. FIG. 5a shows a configuration with a stator 22 and a rotor 23, FIG. 5b shows a configuration with a stator 22, a rotor 23 and a rotor return part 24, FIG. 5c shows a configuration with two stators 25 and 26 and a rotor 27 arranged in between, Figure shows a stator 28 arranged between two rotors 29a and 29b.

FIG. 6 shows a configuration for installing a variant of an axial flux machine with a stator a second stator 31 and a rotor 32 arranged between them in a motor housing 34.

In this regard, the first stator 30 is fixed in the installation direction 33 by an axial stop in the motor housing 34. The rotor 32 is also positioned in the motor housing 34 in the installation direction 33 by the rotor shaft 35 and a suitable bearing 36, for example by inserting the rotor shaft 35 into the bearing 36 pressed into the motor housing 34, while the second stator 31 is fixed in the motor housing 34 by a screw connection 37. The package of active parts of the axial flux machine with the rotor shaft is inserted into the motor housing in the installation direction 33 and brought into position by the positioning aids shown, for example the axial stop between the stator 30 and the motor housing 34, the end stop of the bearing 36 in the motor housing 34, and by the tension/compression mechanism or the tension and/or compression element, which exerts a tensile force on the second stator 31 through the screw connection 37. The tensile force at least partially overcomes the magnetic attractive force acting between the stator 31 and the rotor 32 and creates the air gap 38 between the rotor 32 and the stator 31. The stator 31 engages via a projection and/or a central part on the bearing 36, which is pulled and/or pushed into the bearing end position during fastening via the screw connection 37 on the motor housing. The bearing 36 is fixed to the shaft 35 on the one hand via a shaft shoulder and on the other hand via a circlip.

FIG. 7 shows a second configuration for installing a further variant of an axial flux machine with a stator 39 and a first rotor 40 and a second rotor 41 in a motor housing 42. The motor housing 42 is configured having two parts with a first motor housing part 43 and a second motor housing part 44. Likewise, the rotor shaft 45 is designed with a first rotor shaft part 46 and a second rotor shaft part 47. When the axial flux machine is installed in the motor housing 42, the package of active parts is preferably inserted into the housing with the rotor shaft and the rotor shaft bearing. Then the second motor housing part 44 is placed on the first motor housing part 43 and fastened to it. By means of a screw 48, the first shaft part 46 is then fixed to the bearing and, by means of the screw end, the second shaft part 47 is displaced from the first shaft part 6 and/or out of the first shaft part 46 towards the screwing-in direction of the screw 48, whereby the distances between the active parts are formed and the corresponding air gaps are formed between the rotors and the stator, against the magnetic attractive forces, as is shown schematically.

FIG. 8 shows a third configuration of an axial flux machine. A package of rotor 50, stator 49 and rotor shaft 52, transported in a compact package by the magnetic attractive forces 55, is inserted into the motor housing 51. In this regard, for example, the rotor shaft 52 is pressed into the bearing 53 in the motor housing, but other variants of installation are also possible here. In this case, a holding mechanism is ensured by the axial stop of the rotor shaft on the bearing 53 and/or thus on the motor housing 51. The rotor 50 is fixed by the rotor shaft 52 in the direction of the axial installation direction 54. The stator 49 is brought into position by a tension/compression mechanism. In this regard, the stator 49, which is initially still in contact with the rotor 50 due to the magnetic attractive forces 55, is moved away from the rotor 50 by the tensile forces of the screw connection 57, wherein the magnetic attractive forces 55 between the rotor 50 and the stator 49 are at least partially overcome. This adjusts the air gap 56 between the rotor 50 and the stator 49 and finally fixes the stator 49 to the motor housing 51.

The invention claimed is:

1. A method for installing an axial flux machine with a rotor and a stator in a motor housing, the method comprising:
   configuring the rotor as a first active part with a number of permanent magnets and the stator as a second active part with a number of electrical windings;
   arranging the rotor and the stator adjacent to each other in a rotation-fixed manner to form a compact transport configuration as a stack, wherein magnetic attractive forces between the permanent magnets maintain adjacent positioning, such that at least in partial regions, the rotor is in direct contact with the stator, without clearance or an air gap;
   introducing the transport configuration into the motor housing and positioning it therein;
   utilizing a first mechanical stop arranged on the motor housing to support at least one of the active parts;
   employing a tension and/or compression element arranged on the motor housing to increase a distance between the rotor and the stator, thereby creating at least one operational air gap between the rotor and the stator, counteracting the magnetic attractive forces of the permanent magnets.

2. The method for installing an axial flux machine according to claim 1, wherein the motor housing has a pot-shaped installation space for positioning the axial flux machine and the transport configuration is inserted from a first side into the installation space of the motor housing such that at least the partial regions are covered laterally by the motor housing.

3. The method for installing an axial flux machine according to claim 1, wherein at least one of the active parts of the axial flux machine is fixed in the motor housing via the tension and/or compression element.

4. The method for installing an axial flux machine according to claim 1, wherein the tension and/or compression element is configured as a part of a screw connection.

5. The method for installing an axial flux machine according to claim 2, wherein the stator is positioned in the installation space of the motor housing via the first mechanical stop and the tension and/or compression element enlarges the distance between the rotor and the stator by exerting a tension and/or compression force from a second side of the motor housing opposite to the first side onto the rotor, thereby adjusting the at least one operational air gap between the stator and the rotor.

6. The method for installing an axial flux machine according to claim 5, further comprising arranging a return element as a third active element in the transport configuration on the second side of the rotor opposite to the stator, and after positioning of the transport configuration in the motor housing, removing the return element from the rotor by the tension and/or compression element and/or a further tension and/or compression element, thereby creating a further operational air gap between the rotor and the return element.

7. A transport configuration of the active parts of an axial flux machine for the use in the method according to claim 1.

8. An axial flux machine in a motor housing, which is installed in the motor housing using the method according to claim 1.

* * * * *